US012755954B2

(12) United States Patent
Yu et al.

(10) Patent No.: US 12,755,954 B2
(45) Date of Patent: Oct. 6, 2026

(54) MESH CURRENT COLLECTOR FOR DRY ELECTRODE LAMINATION

(71) Applicant: GM GLOBAL TECHNOLOGY OPERATIONS LLC, Detroit, MI (US)

(72) Inventors: Xiaowei Yu, Troy, MI (US); Ming Wang, Sterling Heights, MI (US); Ryan Curtis Sekol, Grosse Pointe Woods, MI (US); Diptak Bhattacharya, Royal Oak, MI (US); Thomas E. Moylan, Dearborn Heights, MI (US); Jennifer Therese Bracey, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 585 days.

(21) Appl. No.: 18/121,345

(22) Filed: Mar. 14, 2023

(65) Prior Publication Data

US 2024/0313190 A1 Sep. 19, 2024

(51) Int. Cl.

| | |
|---|---|
| ***H01M 4/04*** | (2006.01) |
| ***H01M 4/62*** | (2006.01) |
| ***H01M 4/66*** | (2006.01) |
| ***H01M 4/74*** | (2006.01) |
| ***H01M 4/75*** | (2006.01) |

(52) U.S. Cl.

CPC ......... *H01M 4/0404* (2013.01); *H01M 4/623* (2013.01); *H01M 4/662* (2013.01); *H01M 4/742* (2013.01); *H01M 4/75* (2013.01)

(58) Field of Classification Search

CPC .... H01M 4/0404; H01M 4/623; H01M 4/661; H01M 4/662; H01M 4/742; H01M 10/052; H01M 10/0525

See application file for complete search history.

(56) References Cited

U.S. PATENT DOCUMENTS

| | | | | |
|---|---|---|---|---|
| 2006/0120021 A1* | 6/2006 | Banno | C07C 219/08 361/523 |
| 2021/0320288 A1 | 10/2021 | Althues et al. | |
| 2022/0069273 A1 | 3/2022 | Huemiller et al. | |
| 2022/0069312 A1 | 3/2022 | Irish et al. | |
| 2022/0140353 A1 | 5/2022 | Huemiller | |
| 2022/0267886 A1 | 8/2022 | Balogh et al. | |
| 2022/0271264 A1 | 8/2022 | Xu et al. | |
| 2022/0320504 A1* | 10/2022 | Tiruvannamalai | H01M 4/74 |
| 2022/0376266 A1 | 11/2022 | Hong et al. | |
| 2023/0027323 A1 | 1/2023 | Xu et al. | |

(Continued)

FOREIGN PATENT DOCUMENTS

WO WO-2023284818 A1 1/2023

OTHER PUBLICATIONS

U.S. Appl. No. 17/516,463, filed Nov. 1, 2021, Sachdev et al.

(Continued)

*Primary Examiner* — Matthew T Martin
*Assistant Examiner* — Ankith R Sripathi

(57) ABSTRACT

A method for manufacturing electrodes for a battery cell includes providing a first free-standing electrode; providing a current collector including holes; providing a second free-standing electrode; and laminating the current collector between the first free-standing electrode and the second free-standing electrode using at least one of heat and pressure and without using a solvent.

4 Claims, 4 Drawing Sheets

(56) References Cited

U.S. PATENT DOCUMENTS

2023/0420644 A1 * 12/2023 Kim ...................... H01M 4/366
2024/0097142 A1 3/2024 Hu et al.

OTHER PUBLICATIONS

U.S. Appl. No. 17/560,454, filed Dec. 23, 2021, Tam et al.
U.S. Appl. No. 17/673,437, filed Feb. 16, 2022, Reese et al.
U.S. Appl. No. 17/725,117, filed Apr. 20, 2022, Huemiller et al.
U.S. Appl. No. 17/970,659, filed Oct. 21, 2022, Ren et al.
U.S. Appl. No. 17/983,612, filed Nov. 9, 2022, Yu et al.
U.S. Appl. No. 18/100,199, filed Jan. 23, 2023, Wang et al.
Observations by Third Parties from counterpart DE1020231268694, dated Feb. 20, 2026.

* cited by examiner

MESH CURRENT COLLECTOR FOR DRY ELECTRODE LAMINATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to a battery cell with a mesh current collector and laminated electrodes.

Electric vehicles such as battery electric vehicles and hybrid vehicles include a battery pack including one or more battery modules each including one or more battery cells. When manufacturing the battery cells, a slurry including active material, a binder, and/or solvent is applied to opposite sides of a current collector. Use of solvent in the process increases cost, emissions, and a manufacturing footprint.

SUMMARY

A method for manufacturing electrodes for a battery cell includes providing a first free-standing electrode; providing a current collector including holes; providing a second free-standing electrode; and laminating the current collector between the first free-standing electrode and the second free-standing electrode using at least one of heat and pressure and without using a solvent.

In other features, the first free-standing electrode and the second free-standing electrode comprises an active material that exchanges lithium ions and a binder selected from a group consisting of polytetrafluoroethylene (PTFE) binder and a thermoplastic polymer binder. The first free-standing electrode and the second free-standing electrode are selected from a group consisting of a dry electrode and a semi-dry electrode. The current collector is made of a material selected from a group consisting of aluminum (Al), copper (Cu), carbon (C) and/or stainless steel.

In other features, the current collector comprises at least one of metal foam and a wire mesh. The current collector comprises an expanded metal sheet. The current collector comprises a perforated metal sheet. At least some wires of the wire mesh are coated with a binder coating. The binder coating is selected from a group consisting of polytetrafluoroethylene and a thermoplastic polymer. The thermoplastic polymer is selected from a group consisting of polyvinylidene fluoride (PVDF), polyethylene (PE), polypropylene (PP), poly(acrylic acid) (PAA), poly (vinylidene fluoride-co-hexafluoropropylene) (PVDF-HFP), and combinations thereof. At least some wires of the wire mesh are coated with a conductive coating.

A method for manufacturing electrodes for a battery cell includes providing a first free-standing electrode including an active material that exchanges lithium ions and a binder selected from a group consisting of polytetrafluoroethylene (PTFE) binder and a thermoplastic polymer binder. The first free-standing electrode is selected from group consisting of a dry electrode and a semi-dry electrode. The method includes providing a current collector including holes. The current collector is selected from a group consisting of a wire mesh, metal foam, an expanded metal sheet and a perforated metal sheet. The method includes laminating the current collector to the first free-standing electrode using at least one of heat and pressure and without using a solvent.

In other features, the current collector comprises the wire mesh and at least some wires of the wire mesh are coated with a binder coating. The binder coating is selected from a group consisting of polytetrafluoroethylene (PTFE) and a thermoplastic polymer. The thermoplastic polymer is selected from a group consisting of polyvinylidene fluoride (PVDF), polyethylene (PE), polypropylene (PP), poly (acrylic acid) (PAA), poly (vinylidene fluoride-co-hexafluoropropylene) (PVDF-HFP), and combinations thereof. The current collector comprises the wire mesh and at least some wires of the wire mesh are coated with a conductive coating.

A method for manufacturing electrodes for a battery cell includes providing a first free-standing electrode; providing a second free-standing electrode; providing a current collector including holes, wherein the current collector is selected from a group consisting of a wire mesh, an expanded metal sheet and a perforated metal sheet; and laminating the current collector to the first free-standing electrode and the second free-standing electrode using at least one of heat and pressure without using a solvent. The first free-standing electrode comprises an active material that exchanges lithium ions and a binder selected from a group consisting of polytetrafluoroethylene (PTFE) binder and a thermoplastic polymer binder. The first free-standing electrode is selected from group consisting of a dry electrode and a semi-dry electrode.

In other features, the current collector comprises the wire mesh and at least some wires of the wire mesh are coated with a binder coating. The binder coating is selected from a group consisting of polytetrafluoroethylene and a thermoplastic polymer. The thermoplastic polymer is selected from a group consisting of polyvinylidene fluoride (PVDF), polyethylene (PE), polypropylene (PP), poly(acrylic acid) (PAA), poly (vinylidene fluoride-co-hexafluoropropylene) (PVDF-HFP), and combinations thereof.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
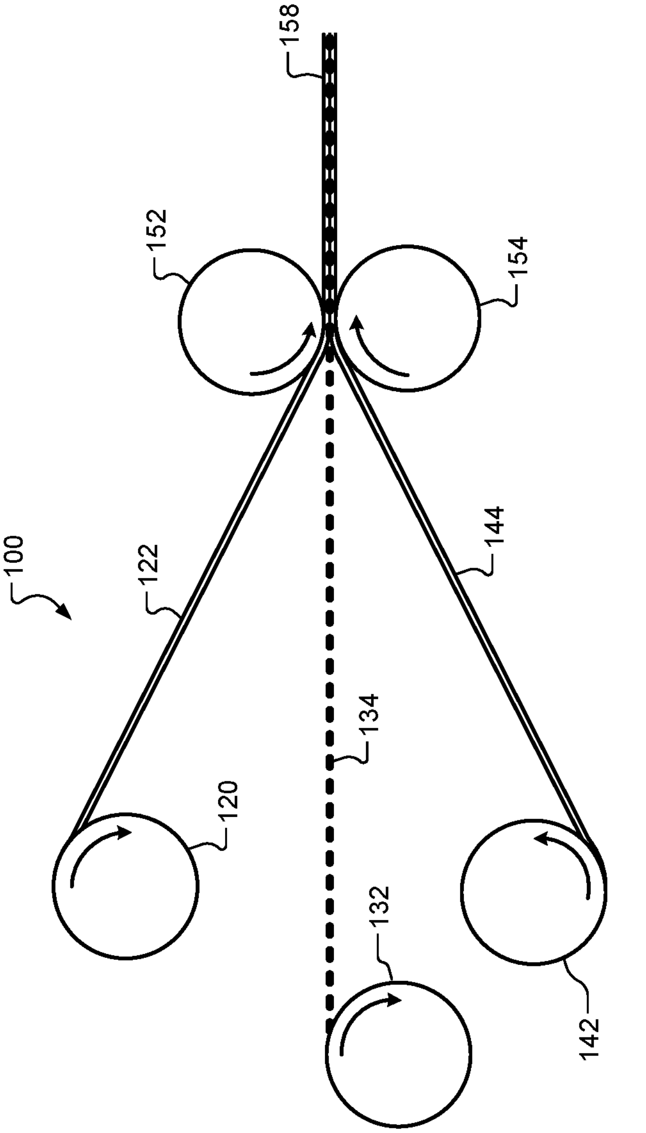
FIG. 1 illustrates an example of a method for manufacturing a battery cell including a mesh current collector and laminated electrodes according to the present disclosure.

While a mesh current collector with laminated electrodes is described in the context of battery cells for electric vehicles, the battery cells can be used in stationary applications or other types of applications.

Battery cells include a plurality of electrodes including anode electrodes and cathode electrodes. The anode electrodes include an anode coating and an anode current collector. The anode coating includes anode active material, solid electrolyte (optional), conductive additive (optional) and a binder. The cathode electrodes include a cathode coating and a cathode current collector. The cathode coating includes a cathode active material, solid electrolyte (optional), conductive additive (optional) and a binder. In some examples, the cathode and anode active materials exchange lithium ions.

When the electrodes are manufactured using a wet process, a slurry (including the active material, the binder, conductive additive (optional), and solvent) is applied to one or both sides of the current collector. However, the solvent increases cost, manufacturing area, and/or the environmental impact.

In a dry electrode process, a power mixture including active material, solid electrolyte (optional), conductive additive (optional), and a binder is mixed. The power is pressed and calendared to create a free-standing film. Solvent usage is eliminated and the manufacturing cost for the electrodes can be reduced. Dry electrode processes also enable technologies such as thicker cathodes and/or all solid-state batteries.

For a dry process, the electrodes are manufactured as free-standing electrodes and then stored on a roll. Then, one or more free-standing electrodes and the current collectors are bonded together using a conductive adhesive, which uses solvent (e.g., N-methyl-pyrrolidone (NMP)). For example, polytetrafluoroethylene (PTFE) may be used as a binder in dry electrode processes. However, PTFE has poor bonding characteristics to other materials. Generally, a conductive adhesive coating is used to bond a PTFE-based dry electrode to the current collector.

The present disclosure relates to self-standing dry or semi-dry electrodes that are laminated onto one or both sides of a current collector including a plurality of holes. The current collector can be made of a wire mesh, metal foam, an expanded metal, or a perforated metal. The self-standing dry or semi-dry electrodes can include PTFE- based binder or a thermoplastic polymeric binder.

In some examples, the roll-to-roll process reactivates the binder during lamination of the self-standing electrodes to the current collector (e.g., by applying heat and/or pressure). For example, the PTFE fibrillates during manufacturing of the self-standing electrodes and can be fibrillated again with shear and/or heat applied by the rollers during lamination to the current collector. In other examples, thermoplastic binders melt and flow during manufacturing of the self-standing electrodes and melt and reflow again due to shear and/or heat applied during lamination to the current collector. As a result, an additional adhesive coating is not required.

The holes in the current collectors (e.g., wire mesh, expanded metal, or perforated metal) enable physical contact to occur between the double-sided electrodes during lamination. As a result, the electrodes and current collector are mechanically supported by both adhesion (electrode to current collector) and cohesion (electrode to electrode) force.

Referring now to FIG. 1, a method 100 for manufacturing electrodes including a current collector 134 laminated to one or more self-standing electrodes 122 and 144 is shown. The self-standing electrodes 122 and 144 comprise dry electrodes or semi- dry electrodes. Semi-dry electrodes use substantially less solvent than traditional wet coatings. In some examples, a semi-dry uses at least 30% less solvent than a traditional wet process. In some examples, solvent wt % in a wet process is in a range from 30 wt % to 50 wt % depending on the materials used. With semi-dry electrodes, the solvent wt % is in a range from 1 wt % to 20 wt % (e.g., 10 wt % to 20 wt %).

A roll 120 supplies the self-standing electrode 122 between rollers 152 and 154. A roll 132 supplies the current collector 134 between rollers 152 and 154. A roll 142 supplies the self-standing electrode 144 between rollers 152 and 154. The current collector 134 is arranged between the self-standing electrodes 122 and 144. The rollers 152 and 154 apply pressure and/or heat to laminate the electrodes 122 and 144 to opposite sides of the current collector 134 without conductive adhesive or solvent. The electrodes 122 and 144 comprise anode electrodes and/or cathode electrodes.

The lamination process eliminates the need for an additional adhesive coatings and/or solvents, which reduces costs. Lamination of the current collector 134 to the electrodes 122 and 144 enables direct physical contact between the electrodes 122 and 144 and provides mechanical support by both adhesion (electrode to current collector) and cohesion (electrode to electrode) force.

In some examples, the current collector 134 is made of a material selected from a group consisting of aluminum (Al), copper (Cu), carbon (C) and/or stainless steel. In some examples, the current collector 134 comprises a wire mesh including interwoven wires. In other examples, the current collector comprises an expanded metal sheet or a perforated metal sheet.

The electrodes can include both dry and semi-dry electrodes. While double- sided lamination is shown, single-sided lamination of the electrode onto one side of the current collector can be performed. The temperature, pressure and rolling gap of the rollers is selected depending upon the properties of the electrodes and the binder that is used.

Figure 2:
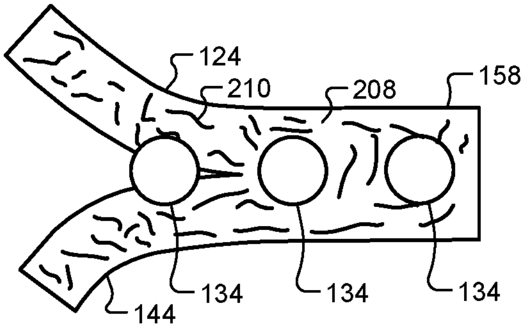
FIG. 2 is a partial side cross-sectional view of an example of a mesh current collector laminated between electrodes including PTFE binder according to the present disclosure.

Referring now to FIG. 2, the current collector 134 is laminated to one or both of the electrodes 122 and 144. The electrodes 122 and 144 include active material 208 and a binder 210 comprising polytetrafluoroethylene (PTFE). The binder 210 is fibrillated during manufacturing of the self-standing electrodes 122 and 144 and then further fibrillation occurs during lamination to the current collector 134.

Figure 3:
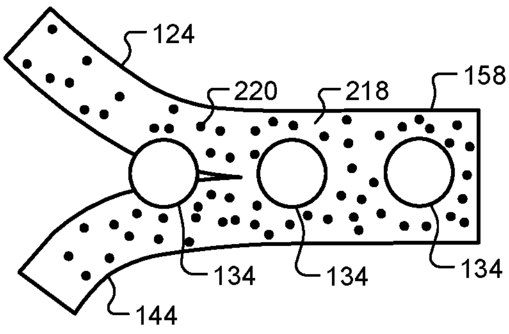
FIG. 3 is a partial side cross-sectional view of an example of a mesh current collector laminated between electrodes including a thermoplastic polymer binder according to the present disclosure.

Referring now to FIG. 3, the current collector 134 is laminated to one or both of the electrodes 122 and 144. The electrodes 122 and 144 include active material 218 and a thermoplastic polymer binder 220. In some examples, the thermoplastic polymer binder 220 includes a material selected from a group consisting of polyvinylidene fluoride (PVDF), polyethylene (PE), polypropylene (PP), poly (acrylic acid) (PAA), poly (vinylidene fluoride-co-hexafluoropropylene) (PVDF-HFP), and combinations thereof. The thermoplastic polymer binder 220 is melted during manufacturing of the self-standing electrodes 122 and 144 and then further melting occurs during lamination to the current collector 134.

Figure 4:
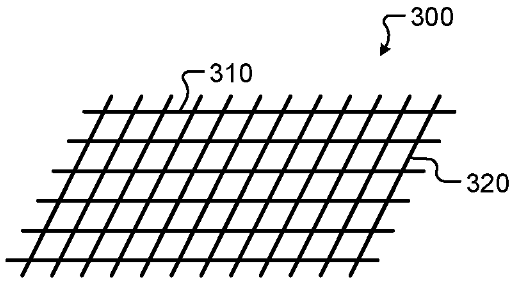
FIG. 4 is a perspective view of an example of a mesh current collector including interwoven wires according to the present disclosure.

Referring now to FIG. 4, a current collector 300 uses the same material for wires 310 arranged in a first direction and wires 320 arranged in a second direction. In some examples, the second direction is transverse to the first direction or more complex patterns can be used.

Figure 5:
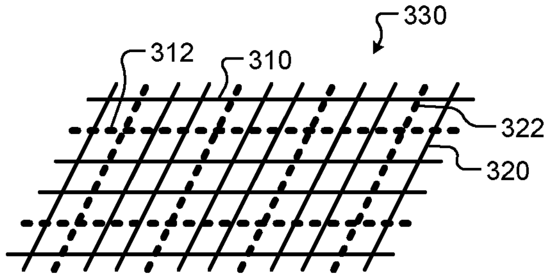
FIG. 5 is a perspective view of an example of a mesh current collector including blended wires according to the present disclosure.

Referring now to FIG. 5, a mesh current collector 330 includes the wires 310 arranged in a first direction and the wires 320 arranged in a second direction. In some examples, the second direction is transverse to the first direction. Some of the wires 310 (e.g., blended wires 312) are made of a second material that is different than the first material used for the wires 310 or are made of the same or different material and include a coating.

Some of the wires 320 (e.g., blended wires 322) are made of a second material that is different than the first material used for the wires 320 or are made of the same or different material and include a coating. While the blended wires 312 and 322 are shown extending in both directions, the blended wires 312 or 322 may be used in one direction or both.

In some examples, the blended wires 312 and 322 comprise metal wires that are coated with a binder material such as PFTE or a thermoplastic polymer. In other examples, the blended wires 312 and 322 comprise metal wires that are coated with a material to reduce interfacial resistance such as carbon, gold, or another material. The coating can be a dry or wet coating.

Figure 6:
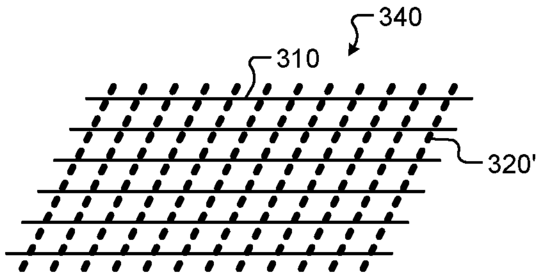
FIG. 6 is a perspective view of an example of a mesh current collector including first wires in one direction and second wires in a transverse direction according to the present disclosure.

Referring now to FIG. 6, a mesh current collector 340 includes the wires 310 arranged in a first direction and the wires 320 arranged in a second direction. The wires 320' are made of a second material that is different than the first material used for the wires 310 or are made of the same or different material but have a coating.

In some examples, the wires 320' are coated with a binder material (such as PTFE or a thermoplastic binder material) or a material to reduce interfacial resistance such as carbon, gold, or another material. The coating can be a dry or wet coating.

Figure 7A:
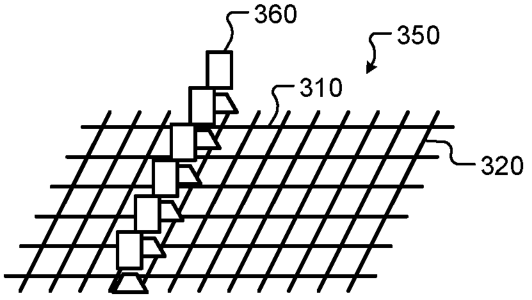
FIGS. 7A and 7B are perspective views of an example of a mesh current collector including wires that are coated according to the present disclosure.
Figure 7B:
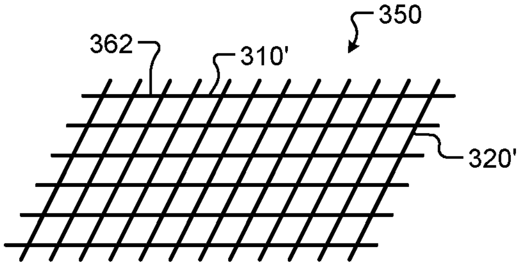

Referring now to FIGS. 7A and 7B, a mesh current collector 350 includes the wires 310 arranged in a first direction and the wires 320 arranged in a second direction. In FIG. 7A, a surface treatment device 360 is used to coat the wires 310 and 320. In FIG. 7B, wires 310' and 320' include a coating 362. In some examples, the coating comprises a binder material such as PTFE or a thermoplastic binder material or a material to reduce interfacial resistance such as carbon, gold, or another material. The coating can be a dry or wet coating.

Figure 8:
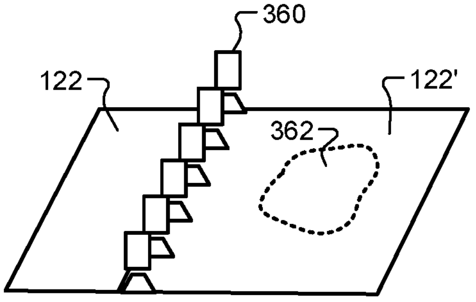
FIG. 8 is a perspective view of a praying device applying a coating onto a surface of the electrode facing the current collector according to the present disclosure.

Referring now to FIG. 8, a surface treatment device 360 applies a coating 362 a surface of the electrode 122 (or 144) facing the current collector 134. In some examples, the coating 362 comprises a binder material such as PTFE or a thermoplastic binder material or a material to reduce interfacial resistance such as carbon, gold, or another material. The coating can be a dry or wet coating.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A method for manufacturing electrodes for a battery cell, comprising:

providing a first free-standing electrode;

providing a second free-standing electrode;

providing a current collector including holes, wherein the current collector is selected from a group consisting of a wire mesh, an expanded metal sheet and a perforated metal sheet;

coating the current collector with a binder coating without using a solvent; and laminating the current collector coated with the binder coating to the first free-standing electrode and the second free-standing electrode using at least one of heat and pressure without using a solvent, wherein the first free-standing electrode is formed with a power mixture that comprises an active material that exchanges lithium ions and a binder selected from a group consisting of polytetrafluoroethylene (PTFE) binder and a thermoplastic polymer binder, wherein the power mixture is pressed and calendared to form the first free-standing electrode without a solvent, wherein the first free-standing electrode is a dry electrode, and wherein the holes enable physical contact between the first free-standing electrode and the second free-standing electrode during the laminating such that the laminating results in electrode to current collector adhesions between the first free-standing electrode and the current collector and between the second free-standing electrode and the current collector in addition to electrode to electrode cohesion between the first free-standing electrode and the second free-standing electrode.

2. The method of claim 1, wherein the current collector comprises the wire mesh.

3. The method of claim 2, wherein the binder coating is selected from a group consisting of polytetrafluoroethylene and a thermoplastic polymer.

4. The method of claim 3, wherein the thermoplastic polymer is selected from a group consisting of polyvinylidene fluoride (PVDF), polyethylene (PE), polypropylene (PP), poly (acrylic acid) (PAA), poly (vinylidene fluoride-co- hexafluoropropylene) (PVDF-HFP), and combinations thereof.

* * * * *